United States Patent [19]

Mackenthun et al.

[11] Patent Number: 4,796,028

[45] Date of Patent: Jan. 3, 1989

[54] APPARATUS FOR BIDIRECTIONAL DATA TRANSMISSION

[75] Inventors: Holger Mackenthun, Hamburg; Hans-Diedrich Kreft, Dassendorf, both of Fed. Rep. of Germany

[73] Assignee: Angewandte Digital Elektronik GmbH, Fed. Rep. of Germany

[21] Appl. No.: 39,436

[22] Filed: Apr. 17, 1987

[30] Foreign Application Priority Data

Apr. 29, 1986 [DE]  Fed. Rep. of Germany ....... 3614477

[51] Int. Cl.$^4$ .......................... H04Q 9/00; G08C 19/24
[52] U.S. Cl. ...................... 340/825.580; 340/825.540; 340/870.31; 340/825.700
[58] Field of Search ........... 340/825.58, 825.7, 825.54, 340/870.31, 825.31; 375/42, 85, 52, 82

[56] References Cited

U.S. PATENT DOCUMENTS

| | | | |
|---|---|---|---|
| 3,088,099 | 4/1963 | Duvall | 340/825.7 |
| 3,488,632 | 1/1970 | Clark III | 340/825.7 |
| 4,549,176 | 10/1985 | Kreft | 340/825.31 |
| 4,654,658 | 3/1987 | Walton | 340/825.54 |
| 4,656,472 | 4/1987 | Walton | 340/825.54 |
| 4,697,183 | 9/1987 | Jenning, et al. | 340/870.31 |

Primary Examiner—Donald J. Yusko
Attorney, Agent, or Firm—Hill, Van Santen, Steadman & Simpson

[57] ABSTRACT

An apparatus for bidirectional data transmission includes a predominantly stationary part with a data line connected to cause a phase shift of an osicllator signal for transmission to a predominantly mobile part. AC signal components of the oscillator signal received by the mobile part are formed into square wave pulses and a difference between high and low states of the pulses is indicative of a phase shift. During the high and low states, positive signal edges of a second oscillation frequency are counted and compared to one another so that predetermined difference causes a status change on a data output line in the mobile part.

2 Claims, 6 Drawing Sheets

APPARATUS FOR BIDIRECTIONAL DATA TRANSMISSION

BACKGROUND OF THE INVENTION

1. Field of the Invention

The present invention relates generally to an apparatus for transmitting data between two parts by inductive transmission, including th possibility of simultaneous bidirectional data transmission.

2. Description of the Related Art

In the field of miniaturized circuit devices, such as for use as high security keys and checking (chip) cards particularly in secured entry control, a problem arises of transmitting signals from a circuit of a first part to a circuit of a second part and vice versa. It is desirable that the first part also supplies energy to the second part during the signal transmission and that only one coil be provided at the first part and only one coil be provided at the second part for use in bidirectional signal transmission, as well as for energy transmission.

Monodirectional signal transmission is provided in known systems by using circuits based on the principle of synchronous switching. Signals in the known devices are transmitted from a mobile part, such as a key or chip card, by short circuiting of a coil at defined points in time which are identified by counting oscillation halfwaves. Such synchronous switching systems are already in use in the lock and key field.

Inductive oscillation transmission is disclosed in U.S. Pat. No. 4,549,176, and corresponding German Patent Application No. P 31 49 789, although without phase shifts.

SUMMARY OF THE PRESENT INVENTION

The present invention resolves the problems inherent in the prior art and provides an expanded system by which signals are transmitted from a predominantly stationary part to a predominantly mobile part, such as from a lock to a key, according to the principle of phase shifting, without requiring an additional coil and without changing the physical, external format of the transmission components. Signal receiving electronic circuitry which operates on the principle of synchronous switching remains fully functional when utilized in the apparatus of the present invention to receive signals from the electronic circuitry of the predominantly mobile part. Thus, only one transmission coil for each of the mobile and stationary parts is required, the synchronous shifting and the phase shifting transmission occurring simultaneously over the same coil pair.

In addition to the integration of circuitry for use in synchronous switching signal transmission, the instant apparatus provides means for evaluating phase shift signal transmissions which can be miniaturized without significant technical problems and, thus, can be accommodated as an integrated circuit on a mobile carrier, such as a key or chip card. Insofar as possible, larger component parts, such as coils, capacitors, or resistors, which are difficult to realize in the field of digital circuitry, are avoided. The circuit of the present device is also extremely stable with respect to environmental influences.

DESCRIPTION OF THE PREFERRED EMBODIMENTS

In FIG 1A, an electrical circuit in a predominantly stationary part, such as a lock of a lock and key system, is shown. The stationary part circuit includes an oscillator OS1 for generating an oscillating clock signal that is transmitted over a lead Z to a first input of an exclusive-OR element EX1, as well as to a clock input of a D-type flip-flop FF1. A data signal is received from other circuit portions (not shown) of the stationary, or lock, portion circuitry at a D-input of the flip-flop FF1. The flip-flop FF1 synchronizes the data signal with the clock signal of the oscillator OS1 and transmits the synchronized data signal over a lead S to a second input of the exclusive-OR element EX1. The exclusive-OR logic element EX1 in turn transmits an output signal over a lead W to a base lead of a transistor $T_1$. The collector and emitter leads of the transistor $T_1$ are connected between ground and a resonant circuit formed by a capacitor $C_1$ and a coil $S_1$. The transistor $T_1$ applies the frequency of the oscillator OS1 to the resonant circuit, and the coil $S_1$ inductively couples the resulting signal to the circuit of a predominantly mobile part as shown in FIG. 2.

FIG. 1B shows selected signals from the circuit of FIG. 1A, including the oscillator output signal appearing on lead Z and the synchronized data signal appearing on lead S. On the third graph showing the signal appearing on the lead W can be seen a 180° phase shift of the oscillator output signal at each transition of the synchronized data signal. The digital pulses present on lead W result in an approximately sinusoidal signal, or oscillation, being generated at a point $f_x$ that is across the coil $S_1$, as shown in the corresponding fourth graph. The phase shifts resulting from state transitions in the synchronized data signal S likewise translate to 180° phase shifts in the sinusoidal oscillation signal $f_x$ across the coil $S_1$. The sinusoidal signal $f_x$ is offset by a DC voltage in the illustrated example. Although the signal $f_x$ is described herein as being sinusoidal, it is possible that other oscillating signals may be present instead.

Figure 1:
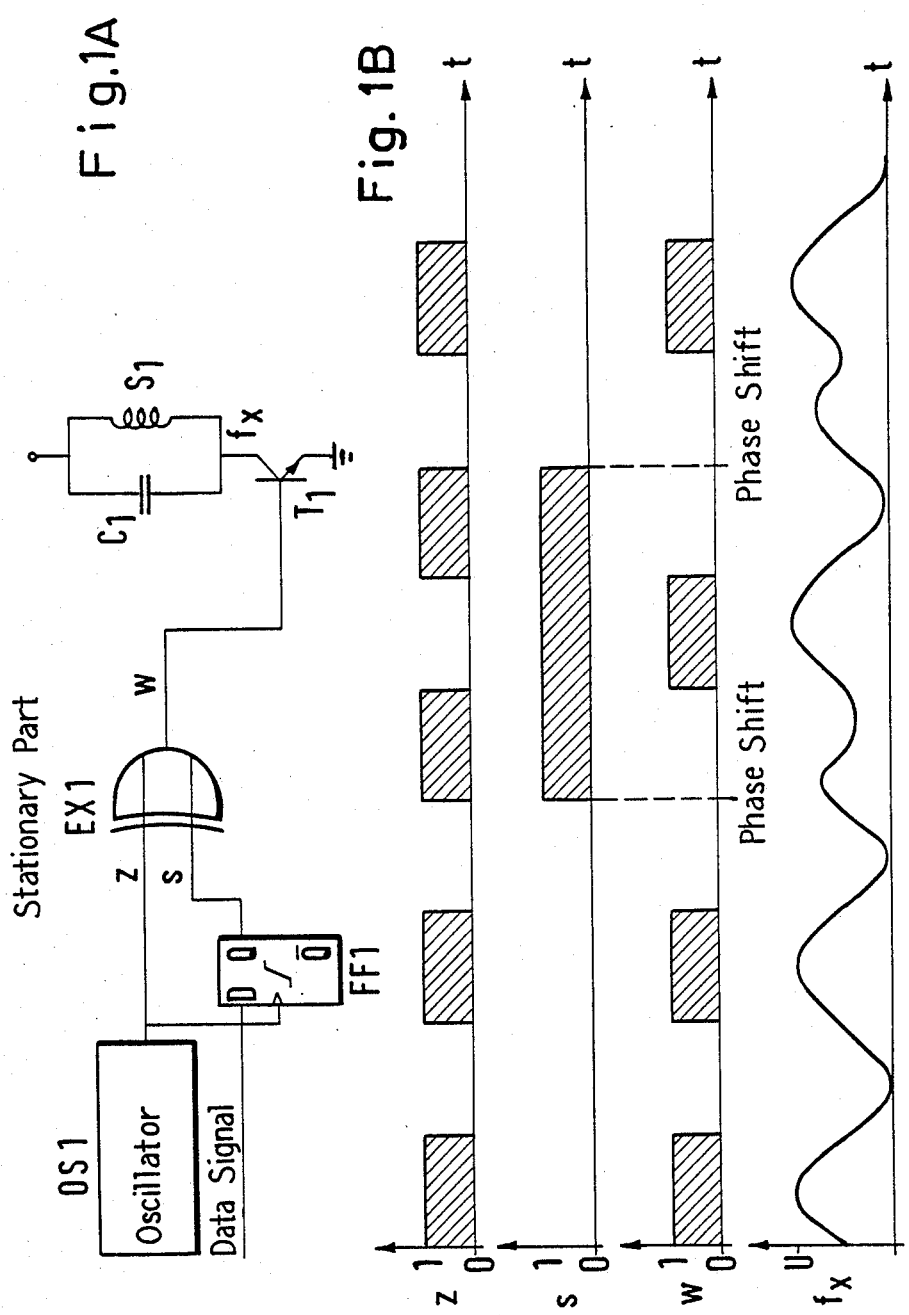
FIG. 1A is a schematic diagram of circuitry provided in a predominantly stationary part according to the principles of the present invention.
FIG. 1B is a series of voltage graphs depicting various signals in the circuitry of FIG. 1A over time.
Figure 2:
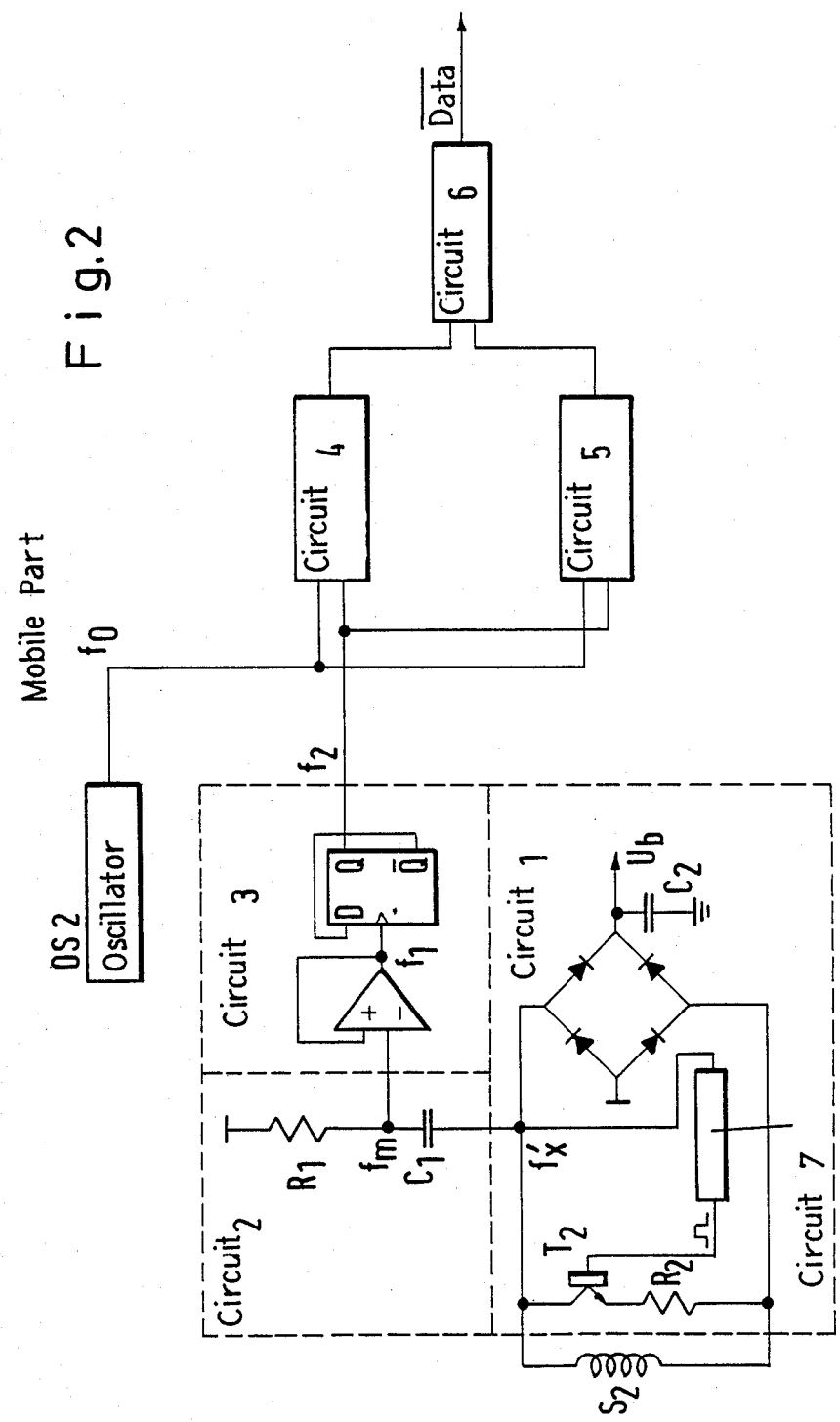
FIG. 2 is a schematic diagram of a circuit in a predominantly mobile part according to the principles of the present invention.

Electrical circuitry of a predominantly mobile part is shown in FIG. 2 for inductive coupling with the predominantly stationary part of FIG. 1 through a coil $S_2$. Energy, in the form of an operating voltage $U_b$ for supplying power to the predominantly mobile part of FIG. 2, is acquired from a DC voltage component of a signal $f_x'$ appearing across the coil $S_2$. The DC signal component $U_b$ is filtered from the coil signal $f_x'$ by a rectifier bridge and a capacitor $C_2$ in a circuit part 1. Also in circuit part 1, a transistor $T_2$ and a resistor $R_2$ are connected across the coil $S_2$, the base of the transistor $T_2$, being fed by a signal from circuit part 7, which shorts the coil $S_2$ at defined points in time as determined by counting half-waves of the oscillation frequency at the point $f_x'$. The transistor $T_2$ and the circuit part 7 correspond to a switch S2 and an electronics unit E2, respectively, as disclosed in U.S. Pat. No. 4,549,176, incorporated herein by reference. The transistor $T_2$ and the circuit part 7 provide data transmission from the mobile part to the stationary part by synchronous switching.

A circuit part 2 shown in FIG. 2 includes a resistor R1 and a capacitor $C_1$ connected to filter out the AC components from the signal at point $f_x'$. The resultant AC signal is fed from a point $f_m$ in the circuit part 2 to an inverting input of an operational amplifier in a circuit part 3. A non-inverting input of the operational amplifier is provided with a feedback signal from an output $f_1$ of the operational amplifier. The amplifier output $f_1$ is supplied to a clock input of a D-type flip-flop, also in the circuit part 3.

Briefly, the circuit of FIG. 2 also includes an oscillator OS2 for producing a fixed frequency signal on lead $f_o$, a circuit part 4 for counting positive signal edges of the fixed frequency $f_o$ while a signal on an output lead $f_2$ from the circuit part 3 is in a high state, a circuit part 5 for counting positive signal edges of the fixed frequency signal $f_o$ while the circuit part 3 output $f_2$ is in a low state, and a circuit part 6 which subtracts the positive signal edges counted by circuit parts 4 and 5 from one another. The fixed frequency signal $f_o$ is, of course, preferably of a higher frequency than the signal produced by the oscillator OS1 of the stationary part, and in one embodiment is of a significantly higher frequency.

Figure 3:
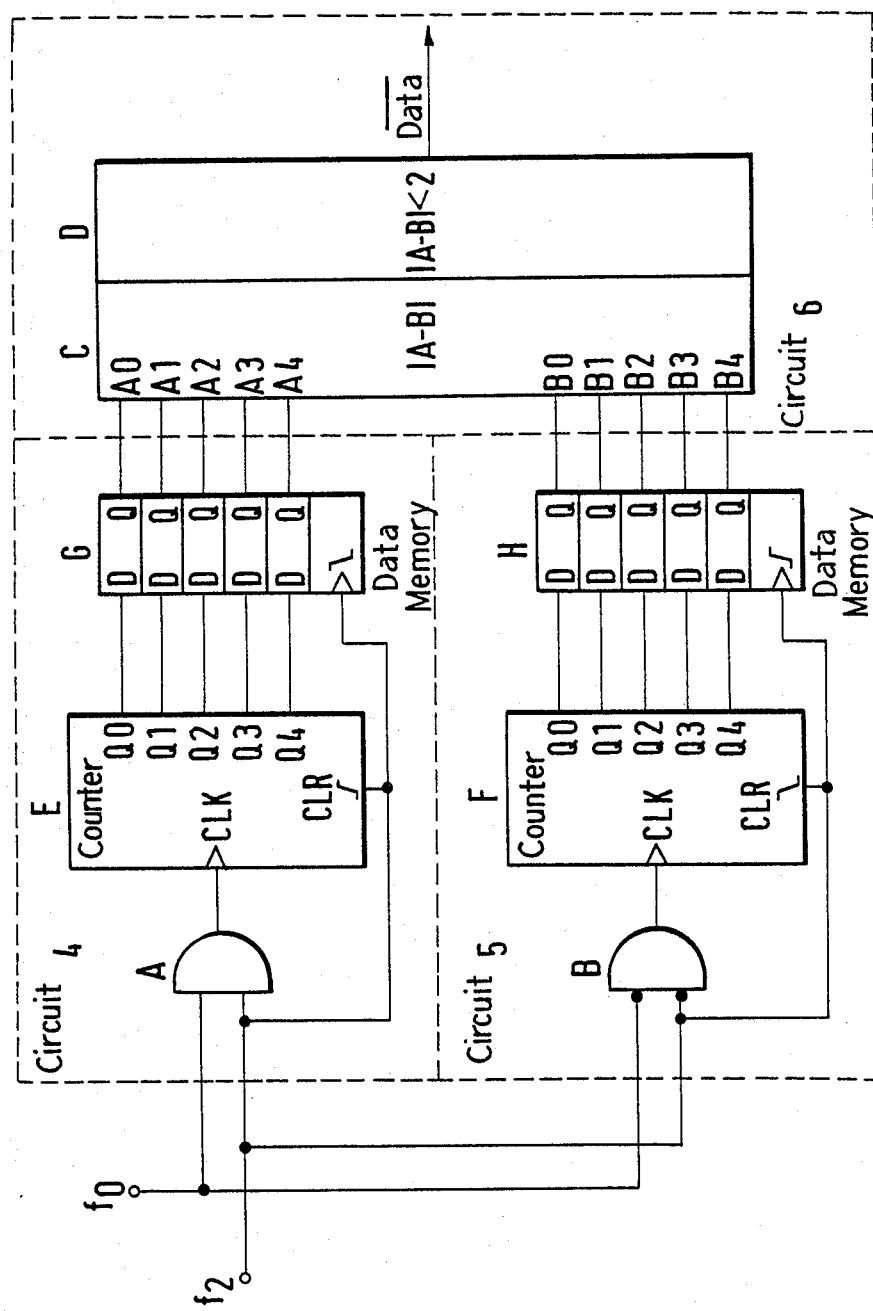
FIG. 3 is a detailed circuit diagram of selected portions of the circuit of FIG. 2.

In FIG. 3, possible embodiments of the circuit parts 4, 5, and 6 from FIG. 2 are shown. In more detail, the circuit part 4 includes an AND logic gate A having its inputs connected to receive signals $f_o$ and $f_2$. The output of the AND gate A is connected to a clock input CLK of a counter E. The signal $f_2$ is also connected to a positive-going clear input CLR of the counter E. Outputs Q0 through Q4 of the counter E are supplied to D-inputs of a data memory G, which has a negative-going clock input fed by the signal $f_2$. Outputs Q of the data memory G are supplied to inputs A0 through A4 of a difference component C in the circuit part 6.

Like the circuit part 4, the part 5 also has an AND logic element B supplied by signals $f_o$ and $f_2$. However, the signals on leads $f_o$ and $f_2$ are first inverted before being supplied to the AND element B. A counter F has a clock input CLK connected at an output of the AND gate B and a negative-going triggered clear input CLR supplied by the signal $f_2$. Outputs Q0 through Q4 of the counter F are supplied to D-inputs of a data memory H, the Q outputs of which are fed to inputs B0 through B4 of the difference component C in the circuit part 6. The data memory H is synchronized by the signal $f_2$ supplied at a positive-going clock input.

The difference component C in the circuit part 6 generates a signal corresponding to the difference of the contents of the data memories G and H. A threshold component D determines when the difference as determined by component C is greater than 1. The output of the component D is provided on a lead $\overline{DATA}$, which assumes a high state when the difference is determined to be greater than 1 and, correspondingly, a low state when the difference is found to be less than one.

Figure 4:
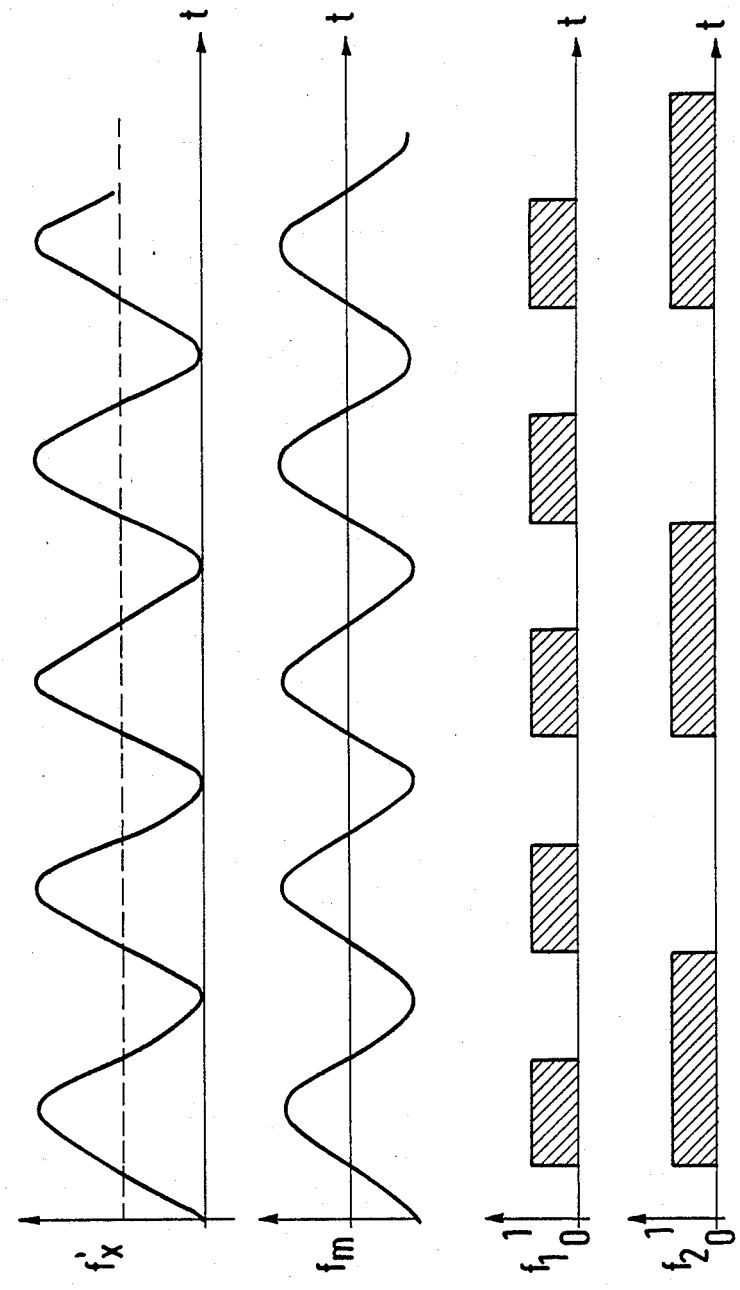
FIG. 4 is a series of voltage graphs over time showing various signals from the circuit of FIG. 2.

In FIG. 4, selected signal graphs from the circuit of FIG. 2 are shown, including an offset sinusoidal signal at point $f_x'$, and the AC filtered component thereof from point $f_m$ of circuit part 2. The signal at point $f_x'$ is inductively received by the mobile part from the stationary part. The operational amplifier in circuit part 3 is overdriven so that it essentially converts the sinusoidal AC voltage of point $f_m$ into square wave pulses (digital signals) at its output lead $f_1$. The duration of the positive half-wave of the AC signal $f_m$ preferably corresponds to the duration of the negative half-wave so that the high state and low state of the resulting signal $f_1$ preferably are of the same durations. If, however, the positive and negative half-waves of the AC voltage component $f_m$ are of different lengths when no phase shift is present, then a circuit for recognizing a phase shift could erroneously determine that a phase shift is present. To avoid this, the operational amplifier output signal $f_1$ is fed through the D flip-flop of circuit part 3 to produce the signal $f_2$ having high and low state durations each corresponding to the period of oscillation of the signal $f_m$. Thus, where no phase shift is present, square wave pulses adapted for digital processing are produced from the AC voltage component of the inductively transmitted oscillating signal $f_x'$.

Figure 5:
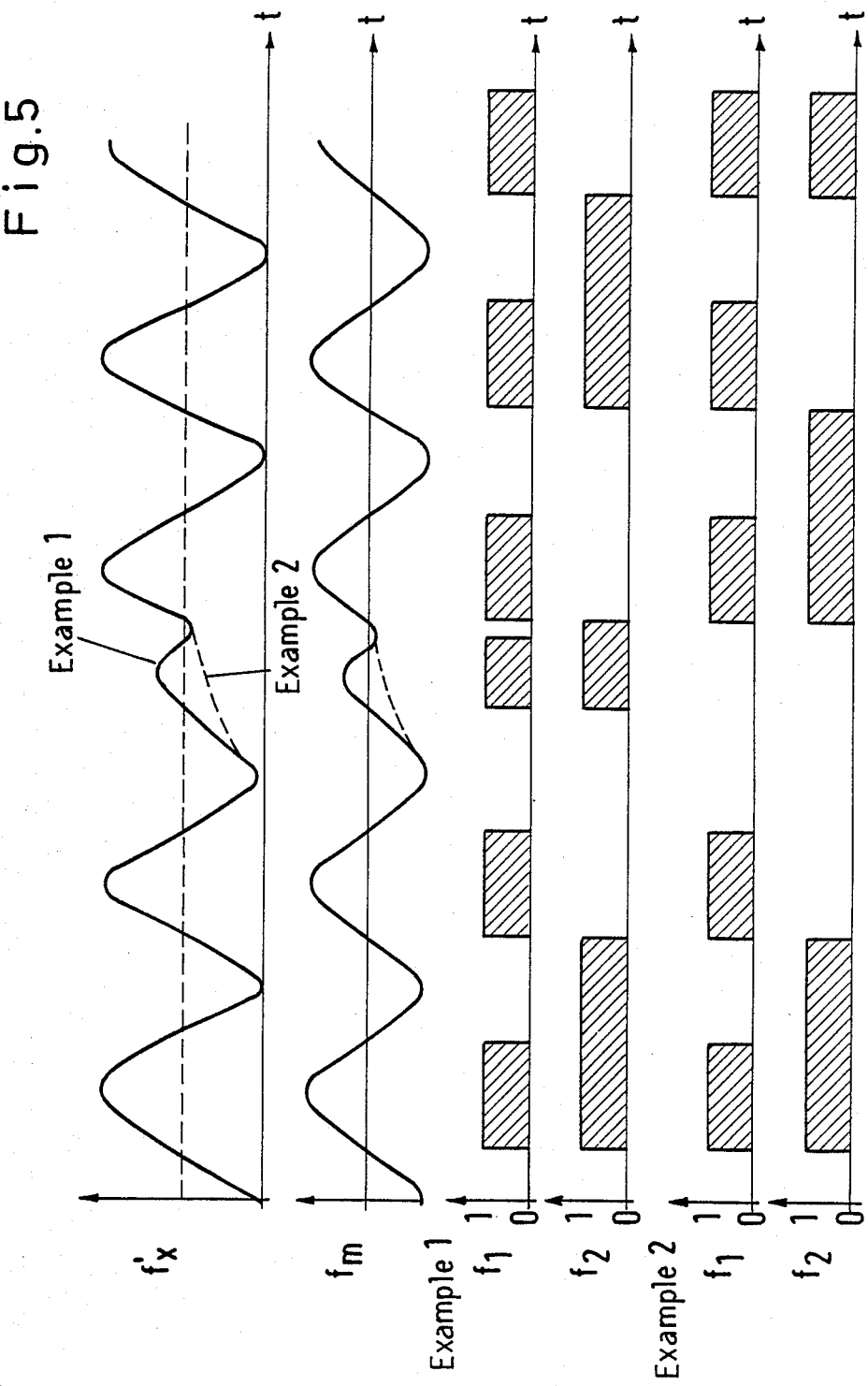
FIG. 5 is a seies of voltage graphs over time of signals from the circuit of FIG. 2 in response to a phase shift.

Referring to the signal diagram of FIG. 5, the inductively transmitted signal $f_x'$ includes a phase shift triggered by a data signal applied to the stationary part. Example 1, shown by solid line, and Example 2, shown by dotted line, indicate that it is inconsequential how the oscillating, or AC, signal behaves in the proximity of the phase shift since any phase shift of 180° results in mutually different durations of the high and low states. The diagrams of the signals $f_1$ and $f_2$ are shown for each of the Examples 1 and 2 in the third and fourth, and fifth and sixth graphs of FIG. 5, indicating that a different signal duration occurs at the phase shift irrespective of its form.

Figure 6:
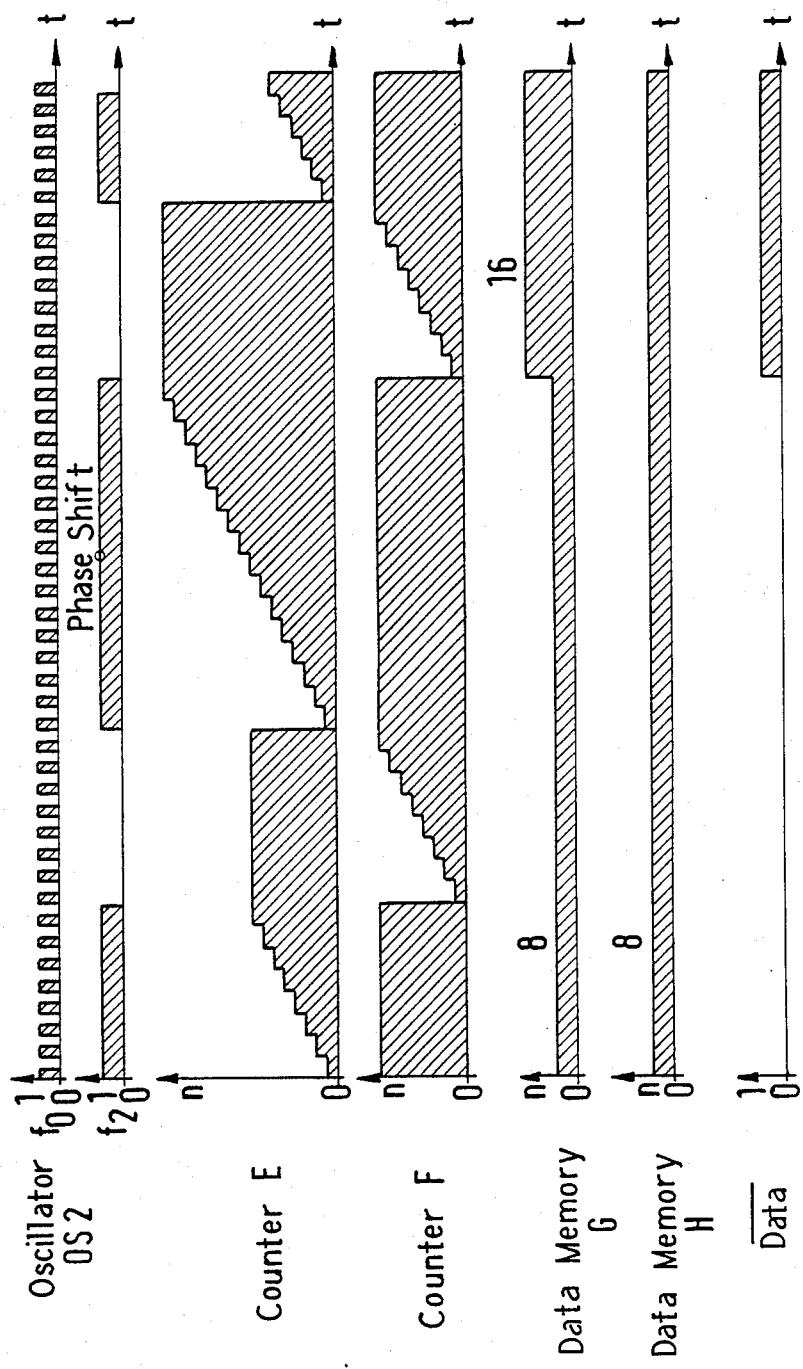
FIG. 6 is a series of voltage graphs over time showing signals from the circuitry of FIG. 3.

Turning now to FIG. 6, signal diagrams are shown appertaining to the circuit shown in FIG. 3. When a high signal is present at lead $f_2$, the counter E counts every positive signal edge of the signal $f_o$ generated by the oscillator OS2. When the signal $f_2$ changes from high to low, then the data memory G accepts a signal corresponding to the number of positive signal edges counted by the counter E. The high to low transition also causes the counter F to be reset. A signal corresponding to the number of positive edge signals counted during the preceding low signal is still stored in the data memory H. Since the difference between the contents of the data memories H and G is less than 2, the output of part 6 at lead $\overline{DATA}$ is low. The counter F now counts positive signal edges during the low portion of the signal $f_2$. When signal $f_2$ changes from low to high, the data memory H accepts a signal corresponding to the edges counted during the low signal, and the counter E is simultaneously reset. The counter E then again counts the positive signal edges during the high portion of signal $f_2$.

When the relationship of the duration of the high signal states to the low signal states of the signal $f_2$ changes, the number of positive signal edges of the oscillator signal $f_o$ counted by the counters E and F also changes, the counter outputs being stored in the data memories G and H. The comparator circuit 6 compares the signal levels stored in the data memories G and H and, upon finding a difference of greater than 1, emits a high signal on lead $\overline{\text{DATA}}$. Thus, a data signal in the stationary part causes a phase shift in an oscillating signal which is detected in the mobile part through time differences in high and low states of the received signal, and the time differences result in a data signal being received by the mobile part.

Thus, the present invention provides an apparatus by which both energy and data can be inductively coupled from a single coil in a stationary part to a single coil in a mobile part, the data being transmitted by phase shifts impressed on an oscillating signal. Additional circuitry, not disclosed in detail herein, also provides for transmission of data from the mobile part to the stationary part by means of synchronous switching as is known, for example, from U.S. Pat. No. 4,549,176. The addition of such synchronous switching circuitry requires little additional outlay and is almost exclusively digital. Therefore, the circuitry disclosed herein can be readily miniaturized as integrated circuits in a form immune from environmental influences to provide a compact and reliable lock and key system.

Although other modifications and changes may be suggested by those skilled in the art, it is the intention of the inventors to embody within the patent warranted hereon all changes and modifications as reasonably and properly come within the scope of their contribution to the art.

We claim as our invention:

1. An apparatus for bidirectional data transmission between a predominantly stationary part and a predominantly mobile part, comprising:

a circuit in said predominantly stationary part including: a first oscillator in said stationary part operable to generate a first oscillating signal, means in said predominantly stationary part for inductively transmitting to said predominantly mobile part during the entire time of data transmission;

means in said stationary part for imposing phase skips at predetermined points in time on said first oscillating signal for data transmission from said stationary part to said mobile part; and a first single coil in said stationary part connected to said first oscillator and to said means for imposing phase skips for transmitting said first oscillating signal with imposed phase skips from said stationary part to said mobile part for simultaneous data and power transmission;

means in said stationary part connected to said first single coil for detecting data transmitted by synchronous switching;

a circuit in said predominantly mobile part including:

a second single coil in said predominantly mobile part positionable for inductive coupling with said first single coil to receive said first oscillating signal with imposed phase skips from said stationary part, means in said mobile part connected to said second coil for transmitting data from said mobile part to said stationary part by synchronous switching, a capacitor connected to said second coil for separating a frequency component from a DC component of said first oscillating signal received by said mobile part, means for supplying said DC component acquired from said first oscillating signal to said circuit in said mobile part, means for generating square wave pulses in said mobile part from said frequency component of said first oscillating signal received from said stationary part, said square wave pulses having a substantially constant chronological relationship between a duration of a high state and a duration of a low state when no phase skips are imposed on said first oscillating signal at said stationary part and having a difference in duration between a high state and a low state when a phase shift is imposed on said first oscillating signal, said rectangular pulse generating means including:

an over-driven operational amplifier connected to receive said frequency component of said first oscillating signal, and a flip-flop connected at an output of said operational amplifier;

a second oscillator in said mobile part operable to generate a second oscillating signal having a significantly higher frequency than said first oscillating signal of said first oscillator in said stationary part;

means for comparing the duration of said high states of said square wave pulses with the duration of said low states of said square wave pulses, including:

means for counting said second oscillating signal of said second oscillator in said mobile part continuously during high and low states of said square wave pulses, said counting means counting said second oscillating signal during one of said high and low states and during a following other one of said respective low and high states, and means for determining differences in the count of said counting means for sequential high and low states, said count differences being a indicative of a phase skip imposed on said first oscillating signal by detecting changes the relative chronological duration of said high and low states, said difference determining means documenting phase skips received from said stationary part by said mobile part by digital comparison of numerical values of counts of said counting means, the phase skips documented by said difference determining means representing data received from said stationary part by said mobile part.

2. An apparatus for bidirectional data transmission between a predominantly stationary part and a predominantly stationary part and a predominantly mobile part, the apparatus comprising:

a first oscillator in said stationary part;

means for transmitting power based on the transformer principle from said stationary part to said mobile part during the entire time of data transmission;

only one coil in each of said mobile part and said stationary part;

means in said mobile part for transmitting signals to said stationary part based on the principle of synchronous switching;

means in said mobile part for generating square-wave pulses from oscillations transmitted from said stationary part;

means in said stationary part for forcing phase skips on said transmitted oscillations at defined points in time;

said means for generating square-wave pulses providing a constant chronological relationship of duration of high status to low status of said square-wave pulses;

a capacitor connected to separate a frequency component of the transmitted oscillations from a constant voltage component;

means for supplying the constant voltage component acquired from the transmitted oscillations to a circuit of said mobile part;

an over-modulated operational amplifier connected to receive the frequency component of the transmitted oscillations;

a flip-flop connected following said operational amplifier;

a second oscillator in said mobile part operable to generate an oscillation signal having a significantly higher frequency than said first oscillator in said stationary part;

means for comparing high times of the square-wave pulses acquired from the transmitted oscillations of said first oscillator of said stationary part to low times of the square-wave pulses;

means for continuously counting the second oscillation signal of said second oscillator of said mobile part during the high and low times of the square-wave pulses acquired from the transmitted oscillations of said first oscillator of said stationary part;

means in said mobile part for detecting phase skips generated by said stationary part by digital comparison of count values of said means for continuously counting, said means for detecting phase skips detecting a phase skip by detecting deviations of count values of said counted second oscillation signal of said second oscillator during a high time relative to an immediately following low time or a low time relative to an immediately following high time of said square-wave pulses, said deviations being indicative of a change in chronological duration of the high times relative to the low times of said square-wave pulses as a consequence of a phase skip in the oscillation of said stationary part acquired by said mobile part.

* * * * *